(12) United States Patent
Shao et al.

(10) Patent No.: US 8,565,513 B2
(45) Date of Patent: Oct. 22, 2013

(54) IMAGE PROCESSING METHOD FOR PROVIDING DEPTH INFORMATION AND IMAGE PROCESSING SYSTEM USING THE SAME

(75) Inventors: Te-Chin Shao, Taichung (TW); Wen-Chao Chen, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 885 days.

(21) Appl. No.: 12/632,954

(22) Filed: Dec. 8, 2009

(65) Prior Publication Data
US 2010/0246938 A1 Sep. 30, 2010

(30) Foreign Application Priority Data
Mar. 24, 2009 (TW) .............................. 98109603 A (51) Int. Cl.
G06K 9/00 (2006.01)
G06K 9/36 (2006.01)

(52) U.S. Cl.
USPC .......................................... 382/154; 382/276

(58) Field of Classification Search
USPC .......................................................... 382/154
See application file for complete search history.

(56) References Cited

U.S. PATENT DOCUMENTS

| | | | |
|---|---|---|---|
| 5,432,331 A * | 7/1995 | Wertheimer | 250/201.7 |
| 6,157,733 A | 12/2000 | Swain | |
| 6,219,461 B1 * | 4/2001 | Wallack | 382/285 |
| 6,778,692 B1 * | 8/2004 | Yazici | 382/132 |
| 6,891,966 B2 * | 5/2005 | Chen | 382/145 |
| 7,035,451 B2 | 4/2006 | Harman et al. | |
| 7,302,096 B2 | 11/2007 | Kim | |
| 7,303,131 B2 * | 12/2007 | Carlson et al. | 235/462.22 |
| 7,616,254 B2 * | 11/2009 | Wong et al. | 348/349 |
| 2005/0104969 A1 * | 5/2005 | Schoelkopf et al. | 348/207.99 |
| 2007/0019883 A1 * | 1/2007 | Wong et al. | 382/276 |
| 2007/0036427 A1 * | 2/2007 | Nakamura et al. | 382/154 |
| 2008/0232680 A1 * | 9/2008 | Berestov et al. | 382/154 |
| 2008/0291268 A1 * | 11/2008 | Berretty | 348/51 |

OTHER PUBLICATIONS

TriDef3D for your PC, DDD, available at http://www.ddd.com/tridef-products/tridef-experience/ (last visited Jan. 15, 2013), p. 1.*

* cited by examiner

*Primary Examiner* — David Zarka
(74) *Attorney, Agent, or Firm* — McClure, Qualey & Rodack, LLP (57) ABSTRACT

An image processing method for providing corresponding depth information according to an input image is provided. This method includes the following steps. First, a reference image is generated according to the input image. Next, the input image and the reference image are divided into a number of input image blocks and a number of reference image blocks, respectively. Then, according to a number of input pixel data of each input image block and a number of reference pixel data of each reference image block, respective variance magnitudes of the input image blocks are obtained. Next, the input image is divided into a number of segmentation regions. Then, the depth information is generated according to the corresponding variance magnitudes of the input image blocks which each segmentation region covers substantially.

36 Claims, 9 Drawing Sheets
(3 of 9 Drawing Sheet(s) Filed in Color)

IMAGE PROCESSING METHOD FOR PROVIDING DEPTH INFORMATION AND IMAGE PROCESSING SYSTEM USING THE SAME

This application claims the benefit of Taiwan application Serial No. 98109603, filed Mar. 24, 2009, the subject matter of which is incorporated herein by reference.

TECHNICAL FIELD

The application relates in general to an image processing method and an image processing system using the same, and more particularly to an image processing method for providing depth information and an image processing system using the same.

BACKGROUND

In the technical field of computer vision, a three-dimensional (3D) content is provided to an auto-stereoscopic display for providing a 3D image with stereo visual perception.

The above-mentioned 3D image includes image plus depth information, which can also be referred to as 2D plus Z information, i.e., a 2D image with depth information. The depth information can be, for example, a depth map corresponding to the 2D image. That is, the depth information can contain depth values for each pixel in the 2D image. Based on the 2D image and the corresponding depth information, the auto-stereoscopic display can exhibit a 3D image, enabling users to perceive stereo visual experience from the generated 3D image.

In order for the auto-stereoscopic display to exhibit 3D images, depth estimation of the depth of the scene in the 2D image is performed. A conventional approach to stereoscopic vision technology estimates the depth through two images captured from the same scene and corresponding to our two eyes. Besides, there is also provided an approach to estimate the depth through multi-images captured on different view angles. Moreover, for the sake of cost reduction and operation convenience, depth estimation can also be performed on an input image, provided by a camera device with a single lens module.

In a conventional way of estimating the depth information with an input image, the input image is analyzed for image characteristic information, and a classification process is performed. In this way, scene characteristics of the input image, such as a ground area, a building, a human body, or a vehicle can be obtained and then served as the basis for determining the image depth. However, such approach is time-consuming on training to classify the input image. Hence, how to generate the corresponding depth information of one input image is still a subject of the industrial endeavor.

BRIEF SUMMARY

Embodiments being provided are directed to an image processing method and an image processing system using the same, which can use one input image to generate its corresponding depth information without spending time on training to classify the input image. The depth information can properly indicate distances of captured objects in the input image, thereby exactly providing the stereo visual perception of the objects in the image.

An exemplary embodiment of an image processing method is provided, which is for providing corresponding depth information according to an input image. The method includes the steps of: generating a reference image according to the input image; dividing the input image and the reference image into a number of input image blocks and a number of reference image blocks, respectively; obtaining respective magnitudes of the input image blocks according to a number of input pixel data of each input image block and a number of reference pixel data of each reference image block; dividing the input image into a number of segmentation regions; generating the depth information according to the corresponding variance magnitudes of the input image blocks which each segmentation region covers substantially.

Another exemplary embodiment of an image processing system is provided, which is for providing corresponding depth information according to an input image. The system includes an input unit, a reference image generation unit, a variance magnitude generation unit, an image segmentation unit, and an output unit. The input unit is used for obtaining the input image. The reference image generation unit is for generating a reference image according to the input image. The variance magnitude generation unit is for dividing the input image and the reference image into a number of input image blocks and a number of reference image blocks, respectively, and for obtaining respective variance magnitudes of the input image blocks according to a number of input pixel data of each input image block and a number of reference pixel data of each reference image block. The image segmentation unit is for dividing the input image into a number of segmentation regions. The output unit is for generating the depth information according to the corresponding variance magnitudes of the input image blocks which each segmentation region covers substantially.

It is to be understood that both the foregoing general description and the following detailed description are exemplary and explanatory only and are not restrictive of the disclosed embodiments, as claimed.

BRIEF DESCRIPTION OF THE DRAWINGS

The file of this patent contains at least one drawing executed in color. Copies of this patent with the color drawing(s) will be provided by the Patent and Trademark Office upon request and payment of the necessary fee.

DETAILED DESCRIPTION

In the disclosed embodiments, a method and a system of image processing are provided to process an input image, thus to provide its corresponding depth information. In an embodiment, an image capturing apparatus, for example, is employed to capture the input image. Besides, the scene objects of input image for use in the embodiments can be, for example, real-world objects captured by the image capturing apparatus, such as a figure or a landscape, or stereographic objects generated based on computer animation technology.

Figure 1A:
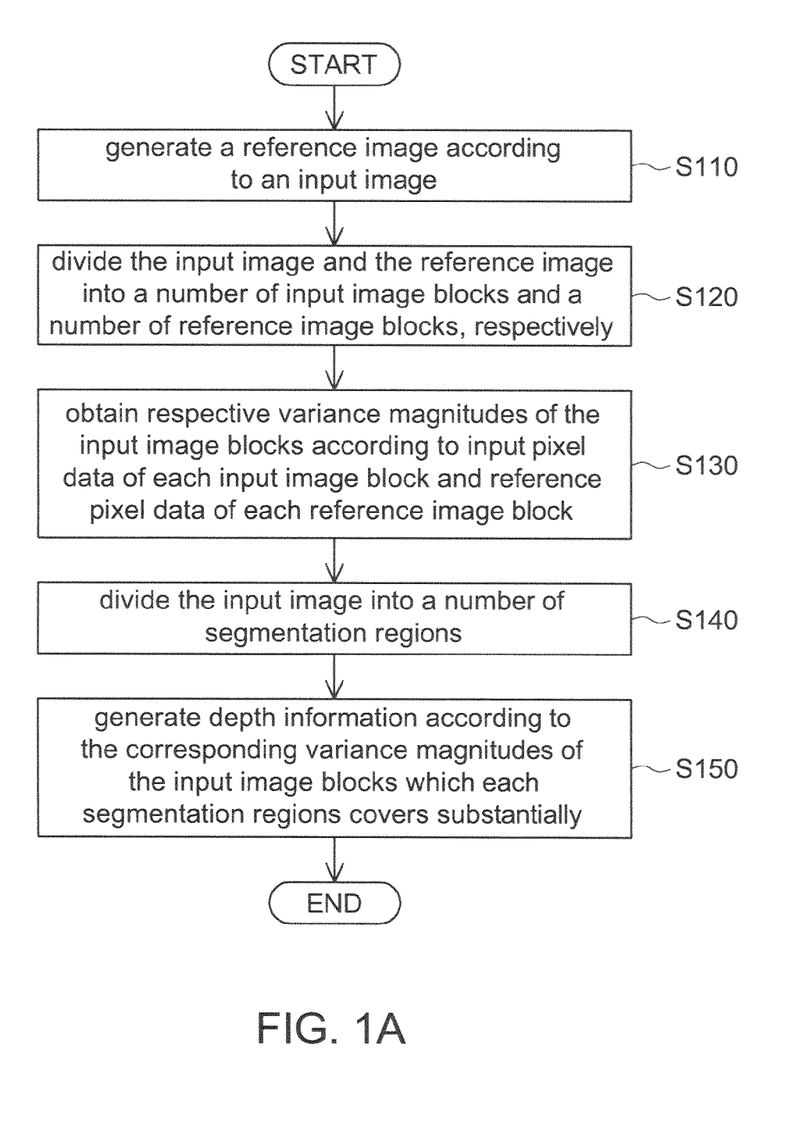
FIG. 1A is a flowchart showing an image processing method according to an exemplary embodiment.

FIG. 1A is a flowchart showing an image processing method according to an exemplary embodiment. The image processing method provides corresponding depth information, such as a depth map, according to an input image. The method includes a number of steps below.

First, as shown in step S110, a reference image is generated according to the input image. Next, as shown in step S120, the input image and the reference image are divided into a number of input image blocks and a number of reference image blocks, respectively.

Then, as shown in step S130, respective variance magnitudes of the input image blocks are obtained according to a number of input pixel data of each input image block and a number of reference pixel data of each reference image block.

Next, as shown in step S140, the input image is divided into a number of segmentation regions. Then, as shown in step S150, the depth information is generated according to the corresponding variance magnitudes of the input image blocks which each segmentation region covers substantially.

Figure 1B:
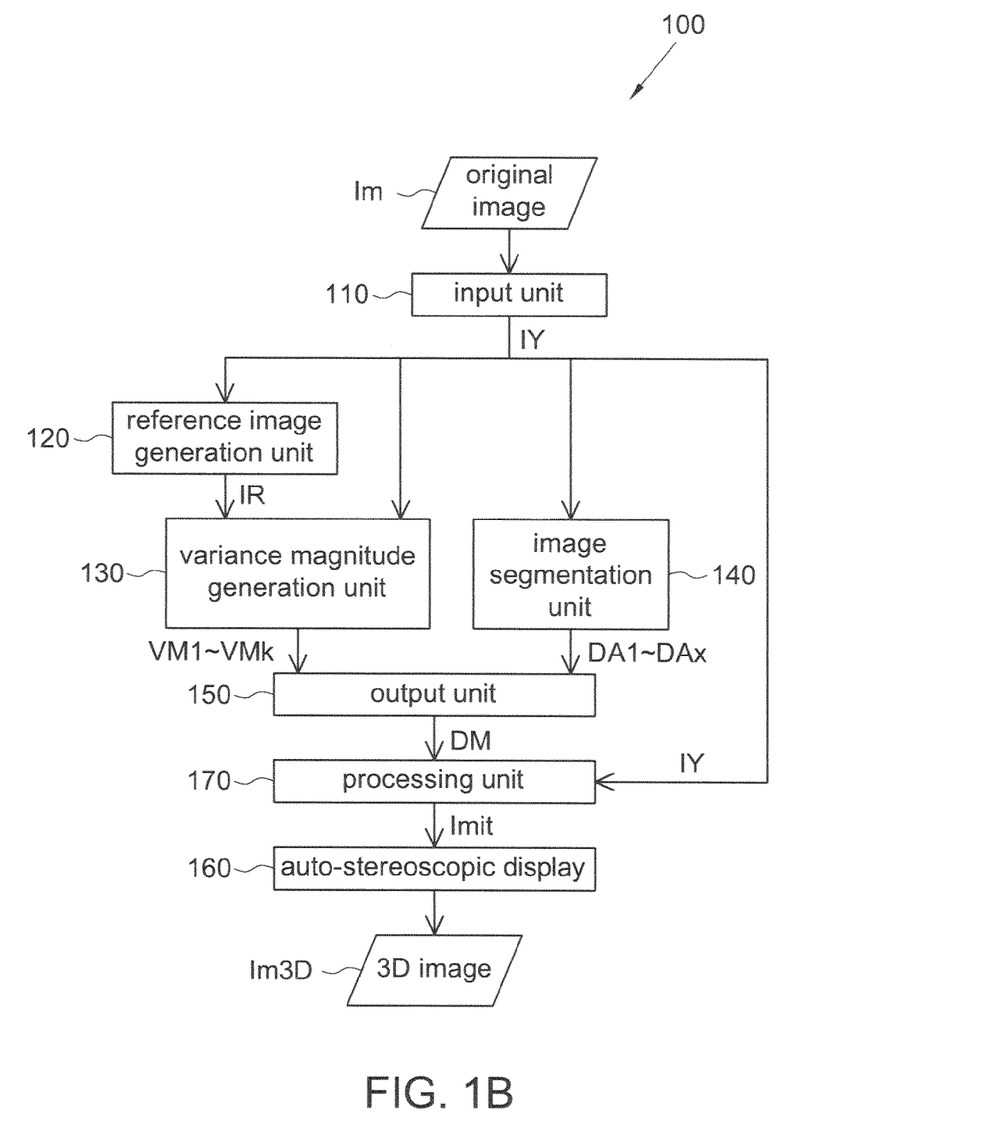
FIG. 1B is a block diagram showing an image processing system according to an exemplary embodiment.

An image processing system will be used to elaborate the image processing method in FIG. 1A for further description. Refer to both FIG. 1A and FIG. 1B, wherein FIG. 1B is a block diagram showing an image processing system according to an exemplary embodiment. The image processing system 100 includes an input unit 110, a reference image generation unit 120, a variance magnitude generation unit 130, an image segmentation unit 140, and an output unit 150. The image processing system 100 of this embodiment can execute the image processing method in FIG. 1A.

Before this embodiment enters the step S110, the input unit 110 can first capture an original image Im, such as a color original image (not shown). The original image Im can be defined with its pixel data in a color space of YCbCr. This embodiment can, for example, take the luminance component of the original image Im as the input image IY because the human eyes are sensitive to luminance variation.

Figure 3:
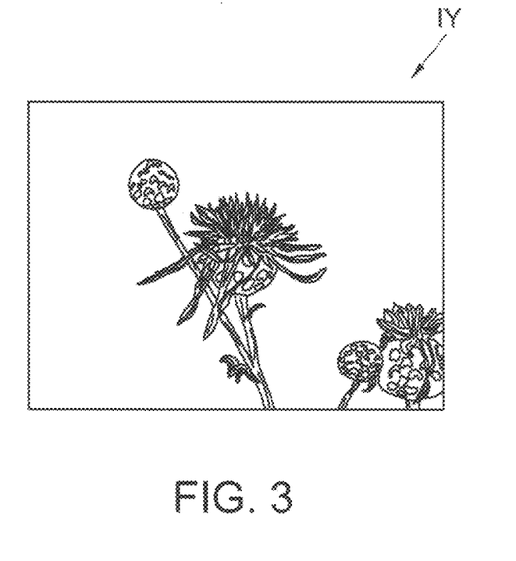
FIG. 3 is a schematic diagram showing an example of an input image.

FIG. 3 is a schematic diagram showing an example of the input image IY. The input image of the exemplary embodiment can be, for example, the input image IY in FIG. 3. The input image IY can be transformed from the color original image Im, which is defined in the color space of YCbCr, by reserving the Y channel component thereof.

Then, this embodiment enters the step S110. In step S110, the reference image generation unit 120 generates a reference image IR according to the input image IY.

Figure 4:
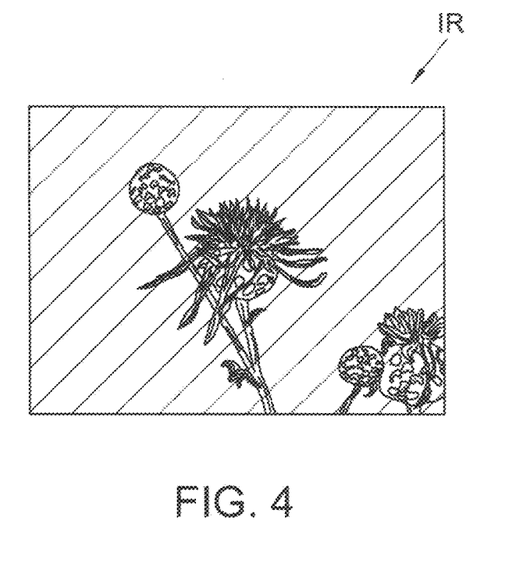
FIG. 4 is a schematic diagram showing an example of a reference image.

FIG. 4 is a schematic diagram showing an example of the reference image IR. The reference image IR can be generated by blurring the input image IY. For example, in order to generate the reference image IR, the reference image generation unit 120 can use a low-pass filter, e.g., a Gaussian filter, or an average mask to blur the input image IY.

Next, in step S120, the variance magnitude generation unit 130 divides the input image and the reference image into a number of input image blocks and a number of reference image blocks, respectively.

Figure 5:
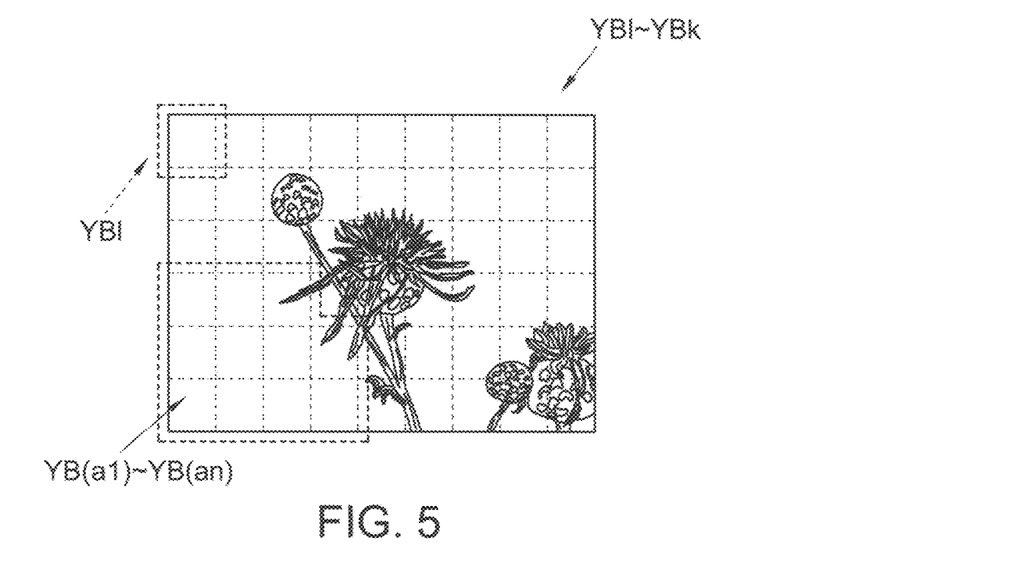
FIGS. 5 and 6 are schematic diagrams each showing an example of a number of input image blocks and a number of reference image blocks after dividing the input image and the reference image in FIGS. 3 and 4.
Figure 6:
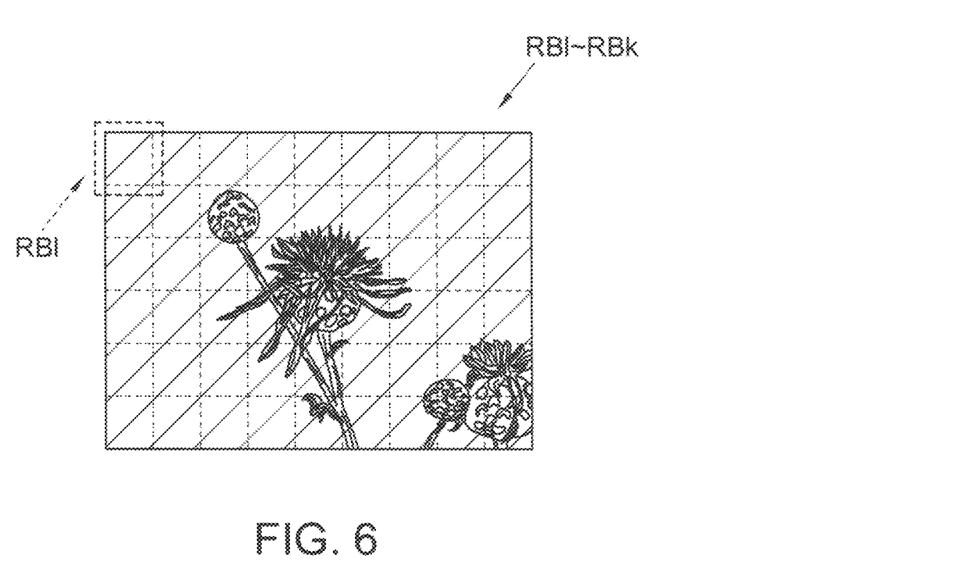

FIGS. 5 and 6 are schematic diagrams each showing an example of dividing the input image and the reference image in FIGS. 3 and 4 into a number of input image blocks and a number of reference image blocks, respectively. In this embodiment, the input image IY can be divided into a number of input image blocks, such as the input image blocks YB1 to YBk, while the reference image IR can also be divided into a number of reference image blocks, such as the reference image blocks RB1 to RBk, in a similar manner. As for the input image blocks YB1 to YBk and the reference image blocks RB1 to RBK, an input image block and a corresponding reference image block, such as the input image block YB1 and the reference image block RB1, have the same image resolution and pixel quantity.

Following that, in step S130, respective variance magnitudes VM1 to VMk of the input image blocks are determined according to a number of input pixel data of each input image block and a number of reference pixel data of each reference image block.

Figure 7:
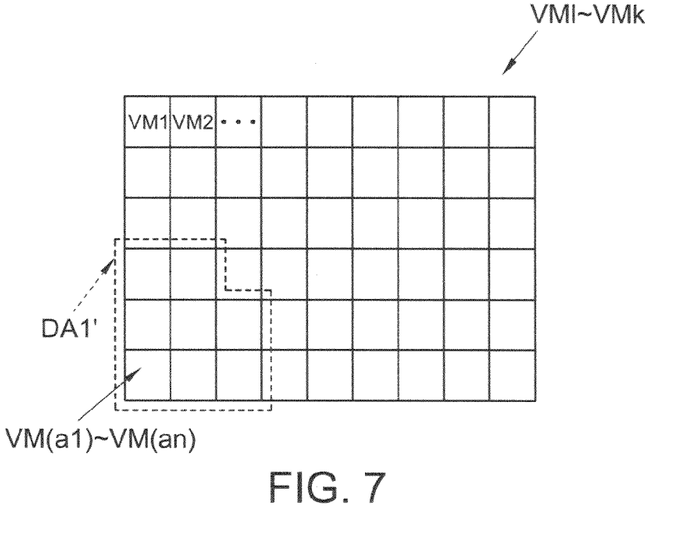
FIG. 7 is a schematic diagram showing an example of the variance magnitude magnitudes of the input image blocks in FIG. 5.

FIG. 7 is a schematic diagram showing an example of the variance magnitudes of the input image blocks YB1 to YBk in FIG. 5. The blocks in FIG. 7 correspond to the input image blocks YB1 to YBk in FIG. 5, and indicate values for representing the obtained variance magnitudes VM1 to VMk in this embodiment. In other words, one input image block, such as the input image block YB1, corresponds to one variance magnitude, such as the variance magnitude VM1.

Figure 2:
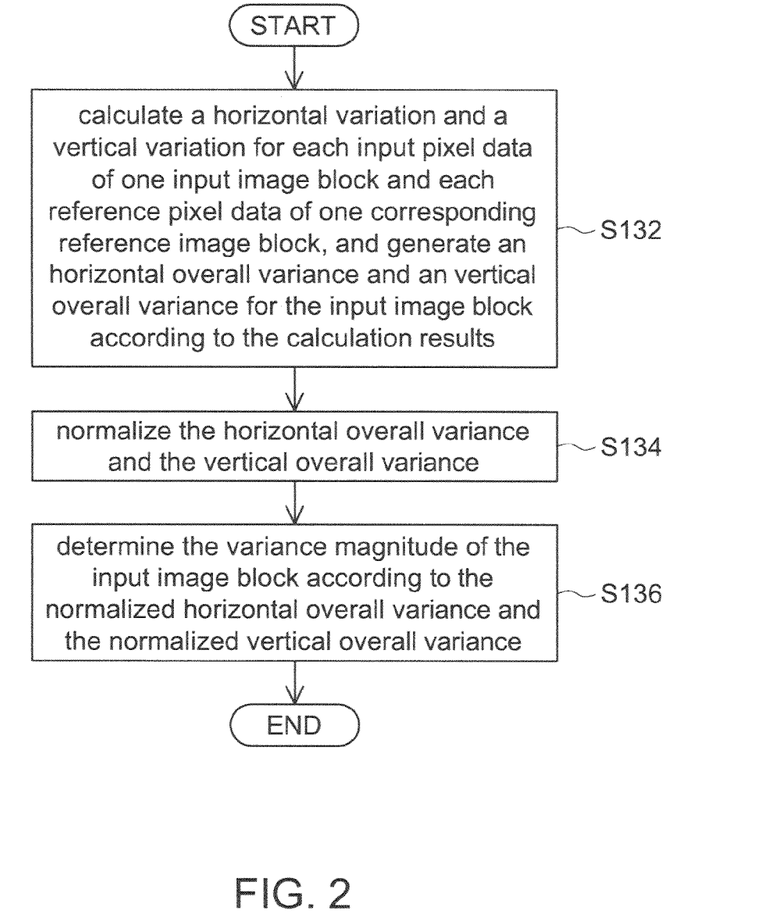
FIG. 2 is a flowchart showing steps S132 to S136 included in the step S130.

Specifically, the step S130 includes, for example, steps S132 to S136. FIG. 2 is a flowchart showing the steps S132 to S136 included in the step S130.

In step S132, for an input image block of the input image blocks and a corresponding reference image block of the reference image blocks, the variance magnitude generation unit 130 calculates a horizontal variation and a vertical variation for each of the input pixel data of the input image block and each of the reference pixel data of the corresponding reference block. Then, the variance magnitude generation unit 130 generates a horizontal overall variance and a vertical overall variance for the input image block according to the calculation results.

The input image block YB1 is taken as an example below to demonstrate how to generate the corresponding horizontal overall variance and vertical overall variance of the input image block YB1. Referring to FIGS. 5 and 6, it is assumed that the input image block YB1 and the reference image block RB1 each include m×n pieces of pixel data. As for the I(i,j)-th pixel data, i is an integer between 0 and (m−1), and j is an integer between 0 to (n−1).

In step S132, the horizontal overall variance of the input image block YB1 can be, for example, generated according to the following equations:

$$D\_Ihor(i, j) = Abs(I(i, j) - I(i-1, j)), \quad \text{Eq. 1}$$
$$\text{for } i = 1 \text{ to } m-1, j = 0 \text{ to } n-1$$

$$D\_Rhor(i, j) = Abs(R(i, j) - R(i-1, j)), \quad \text{Eq. 2}$$
$$\text{for } i = 1 \text{ to } m-1, j = 0 \text{ to } n-1$$

$$D\_Vhori(i, j) = Max(0, D\_Ihor(i, j) - D\_Rhor(i, j)), \quad \text{Eq. 3}$$
$$\text{for } i = 1 \text{ to } m-1, j = 1 \text{ to } n-1$$

$$s\_Vhor = \sum_{i,j=1}^{m-1,n-1} D\_Vhori(i, j) \quad \text{Eq. 4}$$

wherein I(i, j) denotes an (i, j)-th input pixel data in the input image block YB1; R(i, j) denotes an (i, j)-th reference pixel data in the reference image block RB1; Abs(•) denotes an operation for determining absolute value; Max(•) denotes an operation for determining a maximum value; D_Ihor(i, j) denotes a horizontal variation of the (i, j)-th input pixel data in the input image block YB1; D_Rhor(i, j) denotes a horizontal variation of the (i, j)-th reference pixel data in the reference image block RB1; D_Vhor(i, j) denotes a horizontal variance absolute difference of the (i, j)-th input pixel data in the input image block YB1; and s_Vhor denotes a horizontal overall variation of all input pixel data in the input image block YB1.

Moreover, in step S132, the vertical overall variance corresponding to the input image block YB1 can be, for example, generated according to the following equations:

$$D\_Iver(i, j) = Abs(I(i, j) - I(i, j-1)), \quad \text{Eq. 5}$$
$$\text{for } j = 1 \text{ to } n-1, i = 0 \text{ to } m-1$$

$$D\_Rver(i, j) = Abs(R(i, j) - R(i, j-1)), \quad \text{Eq. 6}$$
$$\text{for } j = 1 \text{ to } n-1, i = 0 \text{ to } m-1$$

$$D\_Vver(i, j) = Max(0, D\_Iver(i, j) - D\_Rver(i, j)), \quad \text{Eq. 7}$$
$$\text{for } i = 1 \text{ to } m-1, j = 1 \text{ to } n-1$$

$$s\_Vver = \sum_{i,j=1}^{m-1,n-1} D\_Vver(i, j) \quad \text{Eq. 8}$$

wherein D_Iver(i, j) denotes a vertical variation of the (i, j)-th input pixel data in the input image block YB1; D_Rver(i, j) denotes a vertical variation of the (i, j)-th reference pixel data in the reference image block RB1; D_Vver(i, j) denotes a vertical variance absolute difference of the (i, j)-th input pixel data in the input image block YB1; and s_Vver denotes a vertical overall variation of all input pixel data in the input image block YB1.

Following the step S132 is step S134, in which the variance magnitude generation unit 130 normalizes the horizontal overall variance and the vertical overall variance.

In normalizing the horizontal overall variance and the vertical overall variance, the variance magnitude generation unit 130 can, for example, normalize the horizontal overall variance with a horizontal normalization reference value, and normalize the vertical overall variance with a vertical normalization reference value. The horizontal normalization reference value and the vertical normalization reference value can be obtained according to the following equations:

$$s\_Ihor = \sum_{i,j=1}^{m-1,n-1} D\_Ihor(i, j) \quad \text{Eq. 9}$$

$$s\_Iver = \sum_{i,j=1}^{m-1,n-1} D\_Iver(i, j) \quad \text{Eq. 10}$$

wherein, s_Ihor denotes the horizontal normalization reference value; and s_Iver denotes the vertical normalization reference value.

In this embodiment, the horizontal overall variance and the vertical overall variance can be normalized according to the following equations:

$$c\_Ihor = \frac{s\_Vhor}{s\_Ihor} \quad \text{Eq. 11}$$

$$c\_Iver = \frac{s\_Vver}{s\_Iver} \quad \text{Eq. 12}$$

wherein c_Ihor denotes the normalized horizontal overall variance; c_Iver the normalized vertical overall variance; and the normalized horizontal overall variance and normalized vertical overall variance each is between 0 and 1.

Afterward, as shown in step S136, the variance magnitude generation unit 130 determines the variance magnitude of the input image block according to the normalized horizontal overall variance and the normalized vertical overall variance.

For example, in an exemplary embodiment, the variance magnitude generation unit 130 can determine the larger one of the normalized horizontal overall variance and the normalized vertical overall variance as the variance magnitude VM1 of the input image block YB1. Specifically, the variance magnitude VM1 of the input image block YB1 can be determined according to the following equation:

$$cVar = Max(c\_Iver, c\_Ihor) \quad \text{Eq. 13}$$

wherein cVar denotes the variance magnitude VM1 of the input image block YB1.

As for another exemplary embodiment, in determining the variance magnitude VM1 of the input image block YB1, the variance magnitude generation unit 130 can, for example, calculate a geometric mean of the normalized horizontal overall variance and the normalized vertical overall variance, and this geometric mean serves as the variance magnitude VM1 of the input image block YB1. Specifically, the variance magnitude VM1 of the input image block YB1 can be determined according to an equation as follows:

$$cVar = \sqrt{(c\_Iver)^2 + (c\_Ihor)^2} \quad \text{Eq. 14}$$

In the above embodiment, based on the normalized horizontal overall variance and the normalized vertical overall variance, the variance magnitude VM1 of the input image block YB1 is determined by adopting an index determination equation such as equation 13 or 14 for the sake of illustration, but this exemplary embodiment is not limited thereto. Embodiments can also adopt other kinds of index determination equation in determining the variance magnitude VM1 of the input image block YB1, the detailed description of which is omitted here.

As such, after the steps S132 to S136 are repeated, the variance magnitudes VM1 to VMk of all the input image blocks YB1 to YBk can be determined as shown in FIG. 7.

Next, this embodiment enters step S140. In step S140, the image segmentation unit 140 divides the input image IY into a number of segmentation regions DA1 to DAx. In dividing the input image IY, the image segmentation unit 140 can base on the similarity of image's color, texture, or spatial features, or on the discontinuity of gray values of an image, and thus extract out homogenous regions. For example, the image segmentation unit 140 can divide the images by means of edge detection or region growing.

Figure 8:
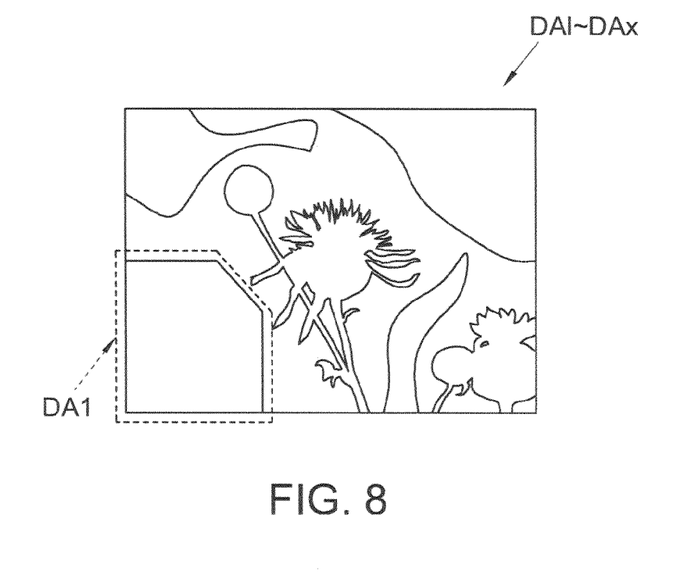
FIG. 8 is a schematic diagram showing an example of a number of segmentation regions which are obtained by dividing the input image in FIG. 3.

FIG. 8 is a schematic diagram showing an example of a number of segmentation regions DA1 to DAx which are obtained by dividing the input image IY in FIG. 3. The image segmentation unit 140 divides the input image IY into the segmentation regions DA1 to DAx in this example.

After step S140, this embodiment can obtain: the variance magnitudes VM1 to VMk of a number of input image blocks YB1 to YBk as shown in FIG. 7, and the segmentation regions DA1 to DAx of input image IY as shown in FIG. 8. Afterwards, this embodiment can utilize the variance magnitudes VM1 to VMk of the input image blocks YB1 to YBk to provide proper depth values for every segmentation regions DA1 to DAx, thus generate corresponding depth information of the input image IY. Hence, this embodiment can use one input image to generate its corresponding depth information without spending time on training to classify the input image.

For further description, referring to step S150, the output unit 150 generates the depth information according to the variance magnitudes VM1 to VMk of the input image blocks which each of the segmentation regions DA1 to DAx covers substantially.

Specifically, in generating the depth information according to the variance magnitudes VM1 to VMk, the output unit 150 can first obtain a variance magnitude representative value of each of the segmentation regions DA1 to DAx according to the variance magnitudes VM1 to VMk of the input image blocks which each of the segmentation regions DA1 to DAx covers substantially. Then, the output unit 150 can generate the depth information according to the variance magnitude representative values of the segmentation regions DA1 to DAx.

Refer to both FIGS. 7 and 8 for illustration. As for a segmentation region DA1, the first selected is a portion of the variance magnitudes VM1 to VMk of the input image blocks YB1 to YBk which the segmentation region DA1 covers substantially, such as the variance magnitudes VM(a1) to VM(an) of the input image blocks YB(a1) to YB(an). In other words, the variance magnitudes VM(a1) to VM(an) of the input image blocks YB(a1) to YB(an) are enclosed substantially in one corresponding region DA1', and the corresponding region DA1' and the segmentation region DA1 have similar areas and locations.

After selecting the variance magnitudes VM(a1) to VM(an), the output unit 150 of this embodiment further determines a variance magnitude representative value of the segmentation region DA1 according to the selected variance magnitudes VM(a1) to VM(an). In an embodiment, the output unit 150 can, for example, but non-limitedly, calculate a mean of the variance magnitudes of the input image blocks which the segmentation region DA1 covers substantially, such as the selected variance magnitudes VM(a1) to VM(an), while the calculated mean is served as the variance magnitude representative value of the segmentation region DA1. In other embodiments, the output unit 150 can also calculate a median of the variance magnitudes of the input image blocks which the segmentation region DA1 covers substantially, and serve it as the variance magnitude representative value of the segmentation region DA1. However, the mean or median is only for the sake of demonstration without any intend of undue limitation. Any approach is regarded as a practicable embodiment as long as a variance magnitude representative value is obtained from the variance magnitudes of the input image blocks which the segmentation region DA1 covers substantially, and used to represent for the variance magnitudes of segmentation region DA1.

From the above step, i.e., the step of determining the variance magnitude representative value of the segmentation region DA1, the variance magnitude representative values of all the segmentation regions DA1 to DAx can be determined. Because that in step S136 the variance magnitudes of the input image blocks VM1 to VMk are determined from the normalized horizontal overall variance and the normalized vertical overall variance which are given within a range between 0 and 1, the variance magnitude representative values are also given within a range between 0 and 1.

Afterwards, the output unit 150 generates the depth information according to the variance magnitude representative values. In practice, the depth information can, for example, be an 8-bit grayscale. That is, the intensity of each pixel in a depth map DM is given within a range from 0 to 255. Therefore, the output unit 150 of this embodiment can perform linear mapping on the variance magnitude representative values to generate the depth information.

In another embodiment, the output unit 150 can perform nonlinear mapping on the variance magnitude representative values to generate the depth information. For example, a histogram of the variance magnitude representative values is useful in mapping the range from 0 to 1 onto the range from 0 to 255. However, this embodiment is not limited thereto. Embodiments can transform the variance magnitude representative values ranging between 0 and 1 into any desired depth information.

Figure 9:
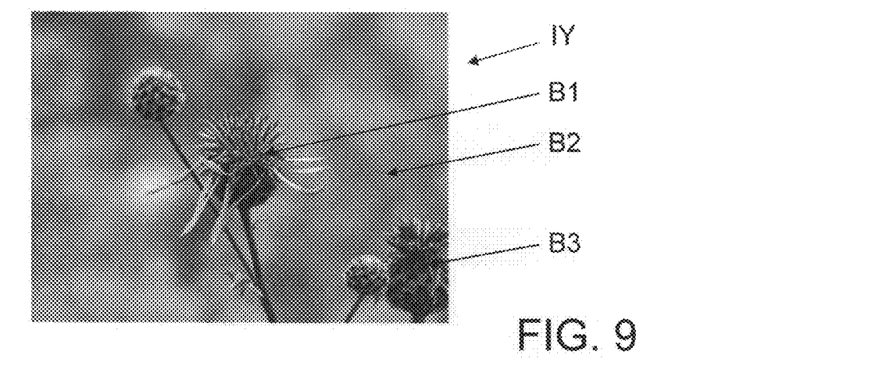
FIG. 9 shows an example of the input image IY in FIG. 3.
Figure 10:
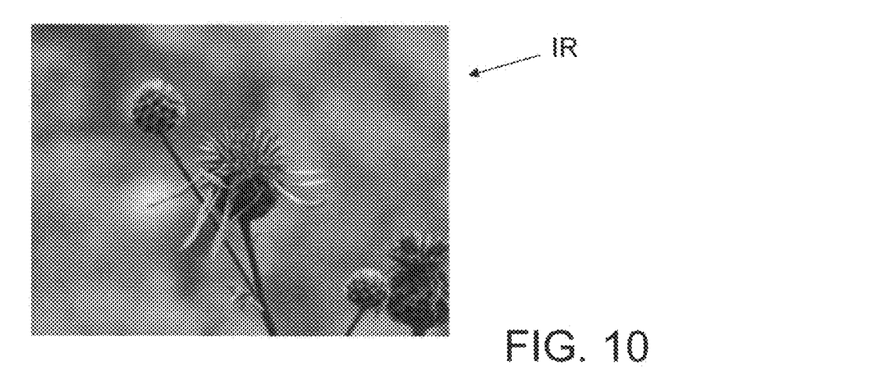
FIG. 10 shows an example of the reference image IR in FIG. 4.
Figure 11:
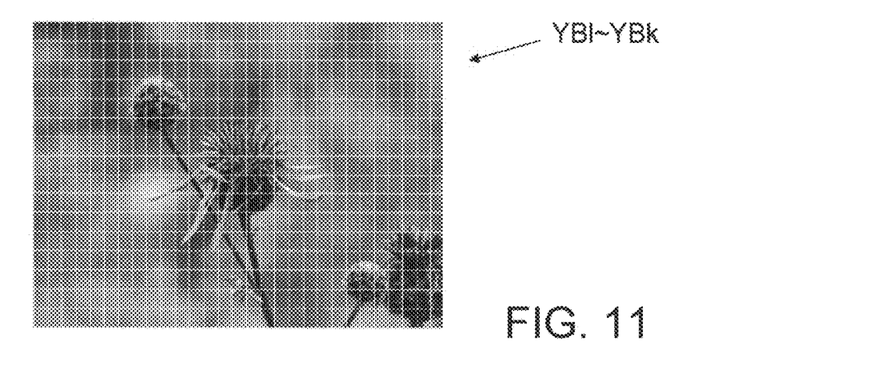
FIG. 11 shows an example of the input image blocks YB1 to YBk in FIG. 5.
Figure 12:
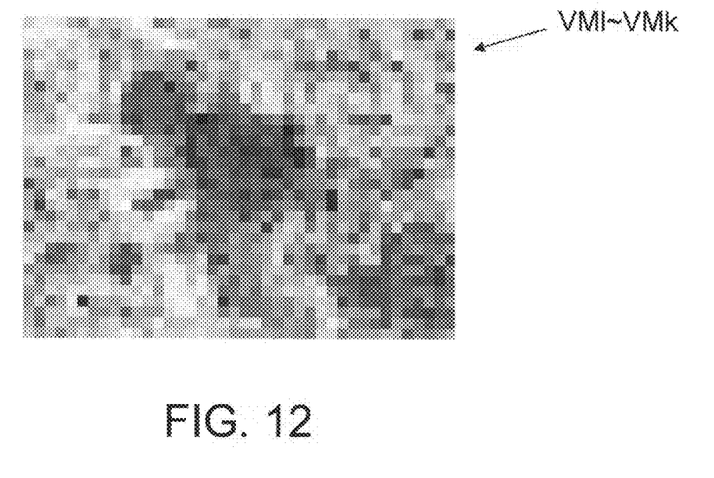
FIG. 12 shows an example of the variance magnitudes VM1 to VMk of the input image blocks YB1 to YBk in FIG. 7.
Figure 13:
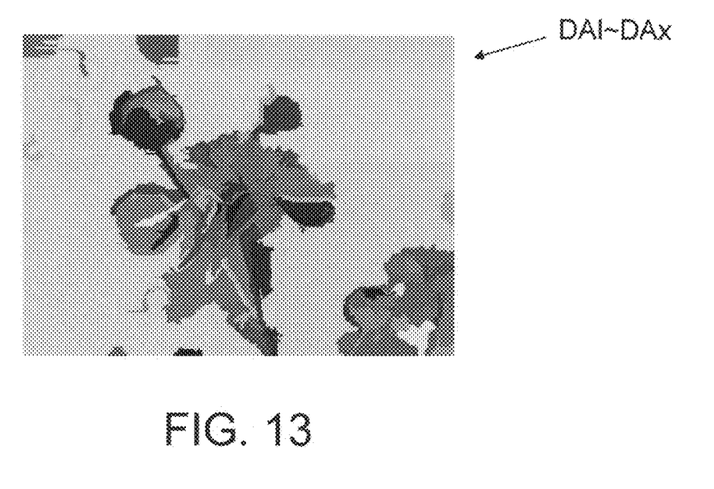
FIG. 13 shows an example of the segmentation regions DA1 to DAx in FIG. 8.
Figure 14:
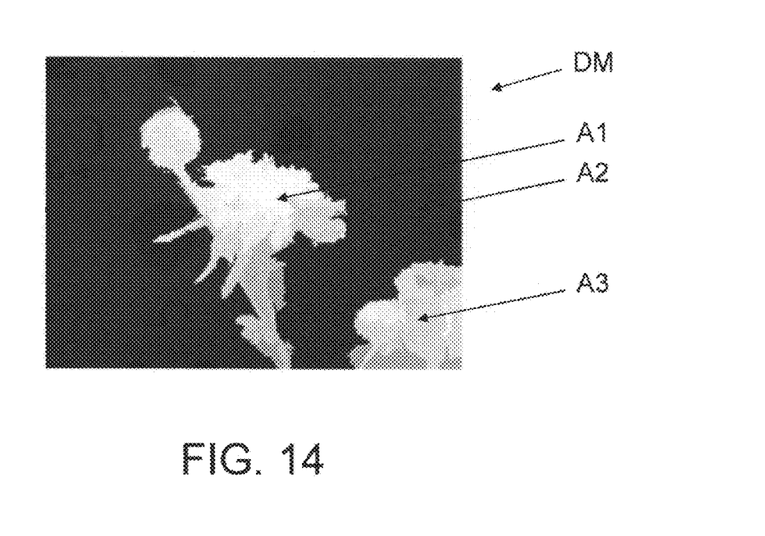
FIG. 14 shows an example of the depth map DM which is generated according to the variance magnitudes VM1 to VMk in FIG. 12 and the segmentation regions DA1 to DAx in FIG. 13.

Referring to FIGS. 9 to 14 for further description. FIG. 9 shows an example of the input image IY in FIG. 3. FIG. 10 shows an example of the reference image IR in FIG. 4. FIG. 11 shows an example of the input image blocks YB1 to YBk in FIG. 5. FIG. 12 shows an example of the variance magnitudes VM1 to VMk of the input image blocks YB1 to YBk in FIG. 7. FIG. 13 shows an example of the segmentation regions DA1 to DAx in FIG. 8. FIG. 14 shows an example of the depth map DM which is generated according to the variance magnitudes VM1 to VMk in FIG. 12 and the segmentation regions DA1 to DAx in FIG. 13.

Refer to both FIGS. 9 and 14. In the depth map DM shown in FIG. 14, the pixels with brighter color, i.e., higher gray level, indicate that the captured object has a closer distance, and the pixels with darker color, i.e., lower gray level, indicate that the captured object has a farther distance. The region A1 has brighter color while it corresponds to a closer object B1 in the input image IY. Accordingly, the region A2 has darker color while it corresponds to a farther object B2 in the input image IY. Therefore, the depth map DM provided by this embodiment can properly express distances of captured objects in the input image IY.

Figure 15:
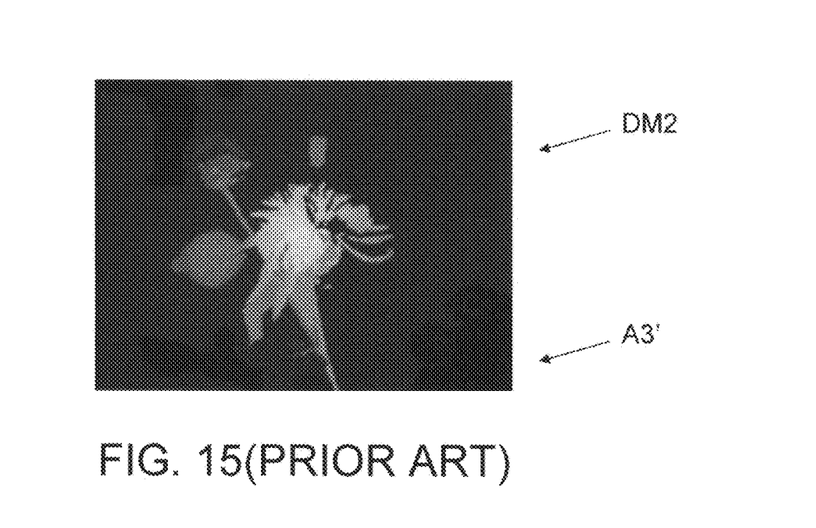
FIG. 15 shows a depth map DM2 which is generated by a 2D to 3D conversion technique, which is provided by a dynamic digital depth (DDD) company located at U.S. State of California.

Moreover, refer to both FIGS. 14 and 15. FIG. 15 shows a depth map DM2 which is generated by a 2D to 3D conversion technique, which is provided by a dynamic digital depth (DDD) company located at U.S. State of California. In the depth map DM2 shown in FIG. 15, its depth configuration is decreased from the central region to the surrounding region in the image. That is, in determining the depth map DM2, the defined is that the central region corresponds to closer distance and the surrounding region corresponds to farther distance. In this way, however, only the objects located on the central region of the image can be provided with adequate stereo visual perception, while the objects located on the surrounding region can not. For example, in the depth map DM2, the surrounding region A3' of the image corresponds to a closer object B3, but is has darker color, i.e., lower gray level.

In this embodiment, the image quality, i.e., clarity or blur, is useful in determining the objects' distances in the image, thereby exactly provide stereo visual perception of the objects in the image. For example, as compared the depth map DM provided in this embodiment with the conventional depth map DM2, the surrounding region A3 of the image has brighter color, and it corresponds to a closer object B3. Therefore, this embodiment can avoid degrading stereo visual perception, but advantageously express stereo visual perception for the objects in both central and surrounding regions of the image.

Besides, in an embodiment, the image processing method can further generate a 3D image, denoted by Im3D. Referring to FIG. 1B, the image processing method applied in the image processing system 100 can further include a step of providing the input image and the corresponding depth information to an auto-stereoscopic display 160 included in the image processing system 100. For example, a processor 170 is useful in generating a multiple-view image according to the input image IY and the depth information, such as the depth map DM, and converting the multiple-view images into an interlaced image Imit by way of interlacing, which is then provided to the auto-stereoscopic display 160. In this way, the auto-stereoscopic display 160 can generate the 3D image Im3D with stereo visual perception.

The disclosed is the image processing method and the image processing system using the same, which is based on an input image and a corresponding reference image to generate the corresponding variance magnitudes of the input image blocks of the input image, and based on the variance magnitudes to determine proper depth values for every segmentation regions of the input image. Therefore, a practical embodiment can use one input image to generate its corresponding depth information without spending time on training to classify the input image. The depth information can properly indicate distances of captured objects in the input image, thereby exactly providing stereo visual perception of the objects in the image.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. An image processing method, for providing corresponding depth information according to an input image, the method comprising:
generating a reference image according to the input image;
dividing the input image and the reference image into a number of input image blocks and a number of reference image blocks, respectively;
obtaining respective variance magnitudes of the input image blocks according to a plurality of input pixel data of each input image block and a plurality of reference pixel data of each reference image block;
dividing the input image into a plurality of segmentation regions;
generating the depth information according to the corresponding variance magnitudes of the input image blocks which each segmentation region covers; and
generating a three-dimensional (3D) image by providing the input image and the corresponding depth information to a stereoscopic display, so that the stereoscopic display generates the 3D image with stereo visual perception wherein the step of obtaining the respective variance magnitudes of the input image blocks comprises:
for an input image block of the input image blocks and a corresponding reference image block of the reference image blocks:
calculating a vertical variation and a horizontal variation for each of the input pixel data of the input image block and each of reference pixel data of the corresponding reference image block;
generating a horizontal overall variance and a vertical overall variance for the input image block according to the calculation results; and
determining a corresponding variance magnitude of the input image block according to the horizontal overall variance and the vertical overall variance.

2. The method according to claim 1, wherein the step of generating the reference image comprises blurring the input image to generate the reference image.

3. The method according to claim 2, wherein the step of blurring the input image is performed by using a low-pass filter or an average mask.

4. The method according to claim 1, wherein the input image block and the corresponding reference image block each include m×n pieces of pixel data, and in the step of generating the corresponding horizontal overall variance of the input image block, the horizontal overall variance is generated according to equations:

$$D\_Iver(i, j) = Abs(I(i, j) - I(i, j-1)),$$
for $j = 1$ to $n-1$, $i = 0$ to $m-1$;

$$D\_Rver(i, j) = Abs(R(i, j) - R(i, j-1)),$$
for $j = 1$ to $n-1$, $i = 0$ to $m-1$;

$$D\_Vver(i, j) = Max(0, D\_Iver(i, j) - D\_Rver(i, j)),$$
for $i = 1$ to $m-1$, $j = 1$ to $n-1$;
and $$s\_Vver = \sum_{i,j=1}^{m-1,n-1} D\_Vver(i, j)$$

wherein
I(i, j) denotes an (i, j)-th input pixel data in the input image block;
R(i, j) denotes an (i, j)-th reference pixel data in the corresponding reference image block;
Abs(•) denotes an operation for determining an absolute value;
Max(•) denotes an operation for determining a maximum value;
D_Ihor(i, j) denotes a horizontal variation of the (i, j)-th input pixel data in the input image block;
D_Rhor(i, j) denotes a horizontal variation of the (i, j)-th reference pixel data in the corresponding reference image block;
D_Vhor(i, j) denotes a horizontal variance absolute difference of the (i, j)-th input pixel data in the input image block; and
s_Vhor denotes a horizontal overall variation of all input pixel data in the input image block.

5. The method according to claim 1, wherein the input image block and the corresponding reference image block each include m×n pieces of pixel data, and in the step of generating the corresponding vertical overall variance of the input image block, the vertical overall variance is generated according to equations:

$$D\_Ihor(i, j) = Abs(I(i, j) - I(i-1, j)),$$

for $i = 1$ to $m - 1$, $j = 0$ to $n - 1$;

$$D\_Iver(i, j) = Abs(I(i, j) - I(i, j-1)),$$

for $j = 1$ to $n - 1$, $i = 0$ to $m - 1$;

$$s\_Ihor = \sum_{i,j=1}^{m-1,n-1} D\_Ihor(i, j); \text{ and}$$

$$s\_Iver = \sum_{i,j=1}^{m-1,n-1} D\_Iver(i, j)$$

wherein

I(i, j) denotes an (i, j)-th input pixel data in the input image block;

R(i, j) denotes an (i, D-th reference pixel data in the corresponding reference image block;

Abs(•) denotes an operation for determining absolute value;

Max(•) denotes an operation for determining a maximum value;

D_Iver(i, j) denotes a vertical variation of the (i, j)-th input pixel data in the input image block;

D_Rver(i, j) denotes a vertical variation of the (i, j)-th reference pixel data in the corresponding reference image block;

D_Vver(i, j) denotes a vertical variance absolute difference of the (i, j)-th input pixel data in the input image block; and s_Vver denotes a horizontal overall variation of all input pixel data in the input image block.

6. The method according to claim 1, wherein before the step of determining the corresponding variance magnitude of the input image block, the method further comprises:

normalizing the horizontal overall variance and the vertical overall variance;

wherein the corresponding variance magnitude of the input image block is determined according to the normalized horizontal overall variance and the normalized vertical overall variance.

7. The method according to claim 6, wherein in the step of normalizing, the horizontal overall variance is normalized with a horizontal normalization reference value, and the vertical overall variance is normalized with a vertical normalization reference value.

8. The method according to claim 7, wherein the input image block and the corresponding reference image block each include m×n pieces of pixel data, and the horizontal normalization reference value and the vertical normalization reference value are generated according to equations:

$$D\_Ihor(i, j) = Abs(I(i, j) - I(i-1, j)),$$

for $i = 1$ to $m - 1$, $j = 0$ to $n - 1$;

$$D\_Rhor(i, j) = Abs(R(i, j) - R(i-1, j)),$$

-continued for $i = 1$ to $m - 1$, $j = 0$ to $n - 1$;

$$D\_Vhor(i, j) = Max(0, D\_Ihor(i, j) - D\_Rhor(i, j)),$$

for $i = 1$ to $m - 1$, $j = 1$ to $n - 1$;

$$\text{and } s\_Vhor = \sum_{i,j=1}^{m-1,n-1} D\_Vhor(i, j)$$

wherein

I(i, j) denotes an (i, j)-th input pixel data in the input image block;

Abs(•) denotes an operation for determining absolute value;

D_Ihor(i, j) denotes a horizontal variation of the (i, j)-th input pixel data in the input image block;

D_Iver(i, j) denotes a vertical variation of the (i, j)-th input pixel data in the input image block;

s_Ihor denotes the horizontal normalization reference value; and s_Iver denotes the vertical normalization reference value.

9. The method according to claim 6, wherein in the step of determining the corresponding variance magnitude of the input image bock, a larger one of the normalized horizontal overall variance and the normalized vertical overall variance is taken as the corresponding variance magnitude of the input image block.

10. The method according to claim 6, wherein in the step of determining the corresponding variance magnitude of the input image bock, a geometric mean of the normalized horizontal overall variance and the normalized vertical overall variance is calculated, and taken as the corresponding variance magnitude of the input image block.

11. The method according to claim 1, wherein the step of dividing the input image is performed by using edge detection.

12. The method according to claim 1, wherein the step of dividing the input image is performed by using region growing.

13. The method according to claim 1, wherein the step of generating the depth information comprises:

obtaining a corresponding variance magnitude representative value of each segmentation region according to the variance magnitudes of the input image blocks which each segmentation region covers substantially; and generating the depth information according to the corresponding variance magnitude representative values of the segmentation regions.

14. The method according to claim 13, wherein in the step of obtaining the variance magnitude representative value of each segmentation region comprises:

calculating a mean of the variance magnitudes of the input image blocks which one segmentation region covers substantially, and thus to serve as the corresponding variance magnitude representative value of the segmentation region.

15. The method according to claim 13, wherein in the step of obtaining the variance magnitude representative value of each segmentation region comprises:

calculating a median of the variance magnitudes of the input image blocks which one segmentation region covers substantially, and thus to serve as the corresponding variance magnitude representative value of the segmentation region.

16. The method according to claim 13, wherein the depth information is generated by performing linear mapping on the variance magnitude representative values.

17. The method according to claim 13, wherein the depth information is generated by performing nonlinear mapping on the variance magnitude representative values.

18. The method according to claim 1, further comprising: capturing an original image, and taking a luminance component of the original image as the input image.

19. An image processing system, for providing corresponding depth information according to an input image, the system comprising:
an input unit for obtaining the input image;
a reference image generation unit for generating a reference image according to the input image;
a variance magnitude generation unit, for dividing the input image and the reference image into a plurality of input image blocks and a plurality of reference image blocks, respectively, and for obtaining respective variance magnitudes of the input image blocks according to a plurality of input pixel data of each input image block and a plurality of reference pixel data of each reference image block, wherein when the variance magnitude generation unit obtains the respective variance magnitudes of the input image blocks, as for an input image block of the input image blocks and a corresponding reference image block of the reference image blocks, the variance magnitude generation unit is for:
calculating a vertical variation and a horizontal variation for each of input pixel data of the input image block and each of the reference pixel data of the corresponding reference image block;
generating a horizontal overall variance and a vertical overall variance for the input image block according to the calculation results; and
determining a corresponding variance magnitude of the input image block according to the horizontal overall variance and the vertical overall variance;
an image segmentation unit for dividing the input image into a plurality of segmentation regions;
an output unit for generating the depth information according to the corresponding variance magnitudes of the input image blocks which each segmentation region covers; and
a stereoscopic display, for receiving the input image and the corresponding depth information and thus to generate a three-dimensional (3D) image with stereo visual perception.

20. The image processing system according to claim 19, wherein the reference image generation unit generates the reference image by blurring the input image.

21. The image processing system according to claim 20, wherein the reference image generation unit uses a low-pass filter or an average mask to blur the input image.

22. The image processing system according to claim 19, wherein the input image block and the corresponding reference image block each include m×n pieces of pixel data, and the variance magnitude generation unit generates the horizontal overall variance according to equations:

$$D\_Ihor(i, j) = Abs(I(i, j) - I(i-1, j)),$$

for $i = 1$ to $m - 1$, $j = 0$ to $n - 1$;

$$D\_Rhor(i, j) = Abs(R(i, j) - R(i-1, j)),$$

for $i = 1$ to $m - 1$, $j = 0$ to $n - 1$;

and $$s\_Vhor = \sum_{i,j=1}^{m-1,n-1} D\_Vhor(i, j)$$

wherein
I(i, j) denotes an (i, j)-th input pixel data in the input image block;
R(i, j) denotes an (i, j)-th reference pixel data in the corresponding reference image block;
Abs(•) denotes an operation for determining absolute value;
Max(•) denotes an operation for determining a maximum value;
D_Ihor(i, j) denotes a horizontal variation of the (i, j)-th input pixel data in the input image block;
D_Rhor(i, j) denotes a horizontal variation of the (i, j)-th reference pixel data in the corresponding reference image block;
D_Vhor(i, j) denotes a horizontal variance absolute difference of the (i, j)-th input pixel data in the input image block; and
s_Vhor denotes a horizontal overall variation of all input pixel data in the input image blocks.

23. The image processing system according to claim 19, wherein the input image block and the corresponding reference image block each include m×n pieces of pixel data, and the variance magnitude generation unit generates the vertical overall variance according to equations:

$$D\_Iver(i, j) = Abs(I(i, j) - I(i, j-1)),$$

for $j = 1$ to $n - 1$, $i = 0$ to $m - 1$;

$$D\_Rver(i, j) = Abs(R(i, j) - R(i, j-1)),$$

for $j = 1$ to $n - 1$, $i = 0$ to $m - 1$;

$$D\_Vver(i, j) = Max(0, D\_Iver(i, j) - D\_Rver(i, j)),$$

for $i = 1$ to $m - 1$, $j = 1$ to $n - 1$;

and $$s\_Vver = \sum_{i,j=1}^{m-1,n-1} D\_Vver(i, j)$$

wherein
I(i, j) denotes an (i, j)-th input pixel data in the input image block;
R(i, j) denotes an (i, j)-th reference pixel data in the corresponding reference image block;
Abs(•) denotes an operation for determining absolute value;
Max(•) denotes an operation for determining a maximum value; D_Iver(i, j) denotes a vertical variation of the (i, j)-th input pixel data in the input image block;
D_Rver(i, j) denotes a vertical variation of the (i, j)-th reference pixel data in the corresponding reference image block;
D_Vver(i, j) denotes a vertical variance absolute difference of the (i, j)-th input pixel data in the input image block; and s_Vver denotes a vertical overall variation of all input pixel data in the input image block.

24. The image processing system according to claim 19, wherein the variance magnitude generation unit is further for normalizing the horizontal overall variance and the vertical overall variance, and determining the corresponding variance magnitude of the input image block according to the normalized horizontal overall variance and the normalized vertical overall variance.

25. The image processing system according to claim 24, wherein the variance magnitude generation unit normalizes the horizontal overall variance with a horizontal normalization reference value, and normalizes the vertical overall variance with a vertical normalization reference value.

26. The image processing system according to claim 25, wherein the input image block and the corresponding reference image block each include m×n pieces of pixel data, and the variance magnitude generation unit generates the horizontal normalization reference value and the vertical normalization reference value according to equations:

$$D\_Ihor(i, j) = Abs(I(i, j) - I(i-1, j)),$$

for $i = 1$ to $m-1$, $j = 0$ to $n-1$;

$$D\_Iver(i, j) = Abs(I(i, j) - I(i, j-1)),$$

for $j = 1$ to $n-1$, $i = 0$ to $m-1$;

$$s\_Ihor = \sum_{i,j=1}^{m-1,n-1} D\_Ihor(i, j); \text{ and}$$

$$s\_Iver = \sum_{i,j=1}^{m-1,n-1} D\_Iver(i, j)$$

wherein

I(i, j) denotes an (i, j)-th input pixel data in the input image block;

Abs(•) denotes an operation for determining absolute value;

D_Ihor(i, j) denotes a horizontal variation of the (i, j)-th input pixel data in the input image block;

D_Iver(i, j) denotes a vertical variation of the (i, j)-th input pixel data in the input image block;

s_Ihor denotes the horizontal normalization reference value; and s_Iver denotes the vertical normalization reference value.

27. The image processing system according to claim 24, wherein the variance magnitude generation unit takes a larger one of the normalized horizontal overall variance and the normalized vertical overall variance as the corresponding variance magnitude of the input image block.

28. The image processing system according to claim 24, wherein the variance magnitude generation unit calculates a geometric mean of the normalized horizontal overall variance and the normalized vertical overall variance, and takes the geometric mean as the corresponding variance magnitude of the input image block.

29. The image processing system according to claim 19, wherein the image segmentation unit divides the input image by using edge detection.

30. The image processing system according to claim 19, wherein the image segmentation unit divides the input image by using region growing.

31. The image processing system according to claim 19, wherein when the output unit generates the depth information, the output unit is for:

obtaining a corresponding variance magnitude representative value of each segmentation region according to the variance magnitudes of the input image blocks which each segmentation region covers substantially; and generating the depth information according to the corresponding variance magnitude representative values of the segmentation regions.

32. The image processing system according to claim 31, wherein the output unit is for calculating a mean of the variance magnitudes of the input image blocks which one segmentation region covers substantially, and takes the mean as the corresponding variance magnitude representative value of the segmentation region.

33. The image processing system according to claim 31, wherein the output unit is for calculating a median of the variance magnitudes of the input image blocks which one segmentation region covers substantially, and takes the median as the corresponding variance magnitude representative value of the segmentation region.

34. The image processing system according to claim 31, wherein the output unit generates the depth information by performing linear mapping on the variance magnitude representative values.

35. The image processing system according to claim 31, wherein the output unit generates the depth information by performing nonlinear mapping on the variance magnitude representative values.

36. The image processing system according to claim 23, wherein the output unit is further for:

capturing an original image, and taking the luminance component of the original image as the input image.

* * * * *